United States Patent
Siva Kumaran et al.

(10) Patent No.: US 10,789,944 B2
(45) Date of Patent: Sep. 29, 2020

(54) PROVIDING SEMANTICALLY RELEVANT ANSWERS TO QUESTIONS

(71) Applicant: Apple Inc., Cupertino, CA (US)

(72) Inventors: Saravana Kumar Siva Kumaran, Fremont, CA (US); Su Yan, Cupertino, CA (US); Ashkan Gholamzadeh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,473

(22) Filed: Sep. 28, 2018

(65) Prior Publication Data

US 2019/0371303 A1 Dec. 5, 2019

Related U.S. Application Data

(60) Provisional application No. 62/679,895, filed on Jun. 3, 2018.

(51) Int. Cl.
*G06F 16/242* (2019.01)
*G10L 15/18* (2013.01)
*G10L 15/22* (2006.01)
*G06N 20/00* (2019.01)
*G06F 16/951* (2019.01)
*G06F 16/332* (2019.01)

(52) U.S. Cl.
CPC ...... *G10L 15/1815* (2013.01); *G06F 16/3329* (2019.01); *G06F 16/951* (2019.01); *G06N 20/00* (2019.01); *G10L 15/22* (2013.01); *G06F 16/2423* (2019.01); *G10L 2015/225* (2013.01)

(58) Field of Classification Search
CPC .................................................. G06F 16/2423
See application file for complete search history.

(56) References Cited

U.S. PATENT DOCUMENTS

| 8,275,803 | B2 | 9/2012 | Brown et al. |
| 9,720,981 | B1* | 8/2017 | Boguraev ........... G06F 16/2423 |
| 2016/0171373 | A1* | 6/2016 | Allen .................... G06F 16/907 706/50 |
| 2017/0060844 | A1* | 3/2017 | He ...................... G06F 16/3329 |
| 2017/0116250 | A1 | 4/2017 | Allen et al. |

\* cited by examiner

*Primary Examiner* — Feng-Tzer Tzeng
(74) *Attorney, Agent, or Firm* — Morgan, Lewis & Bockius LLP (57) ABSTRACT

A device implementing a system for determining whether a semantically relevant answer can be provided with respect to a new question includes a processor configured to identify a question and a semantically relevant answer from source data, and to identify a semantically irrelevant answer to the question from a corpus of data corresponding to the source data based at least in part on the question and the answer. The processor is configured to assign a positive label to the semantically relevant answer, and a negative label to the semantically irrelevant answer. The processor is configured to generate a machine learning model based on the question, the positive label assigned to the semantically relevant answer, and the negative label assigned to the semantically irrelevant answer, and to provide the machine learning model to facilitate a determination of whether a semantically relevant answer can be provided with respect to a subsequent question.

22 Claims, 6 Drawing Sheets

PROVIDING SEMANTICALLY RELEVANT ANSWERS TO QUESTIONS

CROSS-REFERENCE TO RELATED APPLICATIONS

The present application claims the benefit of U.S. Provisional Patent Application Ser. No. 62/679,895, entitled "Providing Semantically Relevant Answers To Questions," filed on Jun. 3, 2018, which is hereby incorporated by reference in its entirety for all purposes.

TECHNICAL FIELD

The present description relates generally to question and answer ("Q&A") services, including utilizing machine learning models for Q&A services.

BACKGROUND

Q&A services allow users to ask questions and receive answers to their questions. For example, a user may verbally ask a question to a virtual assistant, and the virtual assistant may utilize a Q&A service to obtain and provide an answer to the user's question. Similarly, a user may type a question, such as into a search engine, and the search engine may utilize a Q&A service to obtain and provide an answer to the user's question. A Q&A service may typically provide only one answer to the user's question, e.g., the answer determined to most likely be the factually correct answer to the question.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A Q&A service generally provides only a single answer to a given question, e.g., the candidate answer that the Q&A service has determined to most likely be the factually correct answer to the question. In some cases, the candidate answer that the Q&A service has determined to most likely be the factually correct answer to a given question may be a nonsensical answer to provide in response to the question. For example, given the question "what is a group of monkeys called?," a semantically relevant answer may be "a group of monkeys is called a troop." However, an answer such as "monkeys tend to travel in groups," although perhaps factually correct, would be a nonsensical answer to provide in response to the question, and therefore should preferably not be provided as the answer to the question. As such, instead of always providing the candidate answer that the Q&A service has determined to most likely be the factually correct answer to a given question, it may be beneficial to first determine a likelihood that the candidate answer is semantically relevant with respect to the question, and not providing the candidate answer when the candidate answer is determined to likely be semantically irrelevant with respect to the question.

The subject system provides for generating a machine learning model to determine whether a semantically relevant answer can be provided to a question. The subject system accesses source data (e.g., question and answer forums) to obtain questions, and a respective semantically relevant answer for each question. The subject system further searches a corpus of data corresponding to the source data, using the question and semantically relevant answer as the search query, in order to obtain additional answers that are semantically irrelevant with respect to each question. For example, for each question, the system may identify one semantically relevant answer and ten other answers that are semantically irrelevant. These ten other answers may be semantically similar to the question and/or the semantically relevant answer, but may nonetheless be semantically irrelevant with respect to the question. The subject system assigns a positive label to the semantically relevant answer, and a negative label to each of the semantically irrelevant answers. The machine learning model is trained using the question, and the positively and negatively labeled answers. The machine learning model may then be used to determine a likelihood that a given candidate answer is semantically relevant with respect to a subsequent, new question.

For example, a user may query a Q&A service (e.g., provided by a virtual assistant) with the subsequent question. The Q&A service may use the machine learning model to determine a likelihood that the most likely factually correct candidate answer to the question is semantically relevant with respect to the question. If the most likely factually correct candidate answer is determined to likely be semantically irrelevant with respect to the question, the Q&A service may determine that an answer should not be provided for the question. This determination may be beneficial for the user experience, for example, by providing the response "sorry, I can't answer that question," instead of providing an answer that would likely be a nonsensical response with respect to the question.

Figure 1:
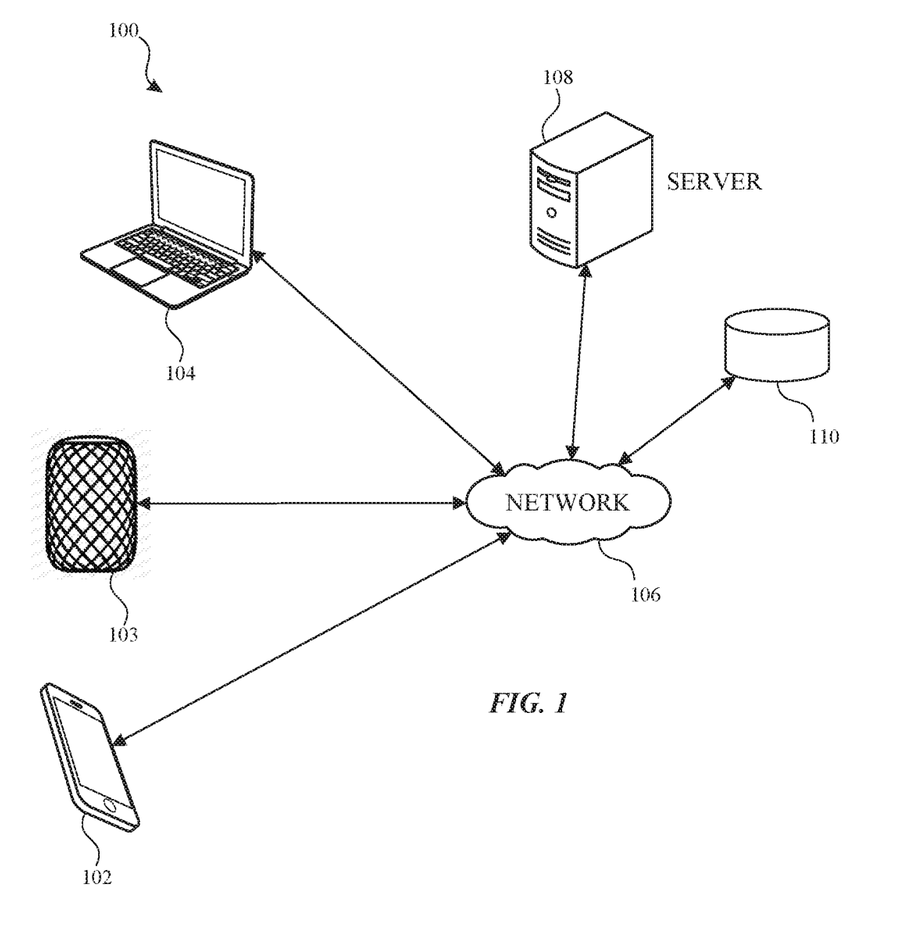
FIG. 1 illustrates an example network environment for determining whether a semantically relevant answer can be provided in response to a question in accordance with one or more implementations.

FIG. 1 illustrates an example network environment for determining whether a semantically relevant answer can be provided in response to a question in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106, a server 108, and a corpus of data 110. The network 106 may communicatively (directly or indirectly) couple, for example, any two or more of the electronic devices 102-104, the server 108, and/or the corpus of data 110. In one or more implementations, the network 106 may be an interconnected network of devices that may include, or may be communicatively coupled to, the Internet. For explanatory purposes, the network environment 100 is illustrated in FIG. 1 as including electronic devices 102-104, a single server 108 and a single corpus of data 110; however, the network environment 100 may include any number of electronic devices, any number of servers, and any number of corpuses of data.

One or more of the electronic devices 102-104 may be, for example, a portable computing device such as a laptop computer, a smartphone, a smart speaker, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smart speaker and the electronic device 104 is depicted as a laptop computer. Each of the electronic devices 102-104 may be, and/or may include all or part of, the electronic system discussed below with respect to FIG. 6.

The server 108 may be, and/or may include all or part of the server discussed below with respect to FIG. 2, and/or the electronic system discussed below with respect to FIG. 6. The server 108 may include one or more servers, such as a cloud of servers, that may be used to implement a Q&A service. In addition, the server 108 may train a machine learning model which may be employed by the Q&A service, to determine whether an answer should be provided in response to a given question, e.g. to determine a likelihood that the most likely factually correct answer to the question is a semantically relevant response to the question. For explanatory purposes, a single server 108 is shown and discussed with respect to various operations, such as crawling web sites, training a machine learning model, providing a Q&A service, etc. However, these and other operations discussed herein may be performed by one or more servers, and each different operation may be performed by the same or different servers.

The machine learning model may be trained using question and answer data obtained from the corpus of data 110. The corpus of data 110 is illustrated in FIG. 1 as separate from the server 108. However, all or part of the corpus of data 110 may instead be stored locally with respect to the server 108. In one or more implementations, the corpus of data 110 may be obtained by the server 108 by crawling one or more web pages that include questions and answers to the questions.

For example, some web sites may provide forums where a user can ask a question and other users can provide answers to the question. The users (and/or a web site administrator) may select the correct answer to the question, and the selected answer may be displayed on the web site with an indicator that it is the correct answer to the question. Accordingly, the server 108 may scrape the web site to obtain all of the questions asked on the web site, and may generate a question index that includes all of the asked questions. Similarly, the server 108 may scrape the web site to obtain all of the answers provided on the web site, and may generate an answer index that includes all of the provided answers. Each question in the question index may be stored with an indicator of the answer in the answer index that is the correct answer to the question. Thus, corpus of data 110 may correspond to the generated question and answer indices, where the questions, answers and indicator values were sourced from the forum data.

After the machine learning model has been trained using the corpus of data 110, a user may input a question within an application running on one of the electronic devices 102-104, such as the electronic device 102. The electronic device 102 may send the question to the Q&A service provided by the server 108. The server 108 may use the machine learning model to determine whether or not to provide an answer to the question, e.g., whether or not the best candidate answer is likely to be semantically relevant with respect to the question. The server 108 may then provide a corresponding response to the electronic device 102. For example, the server 108 may provide an answer to the question, or a message that the Q&A service cannot provide an answer to the question.

Figure 2:
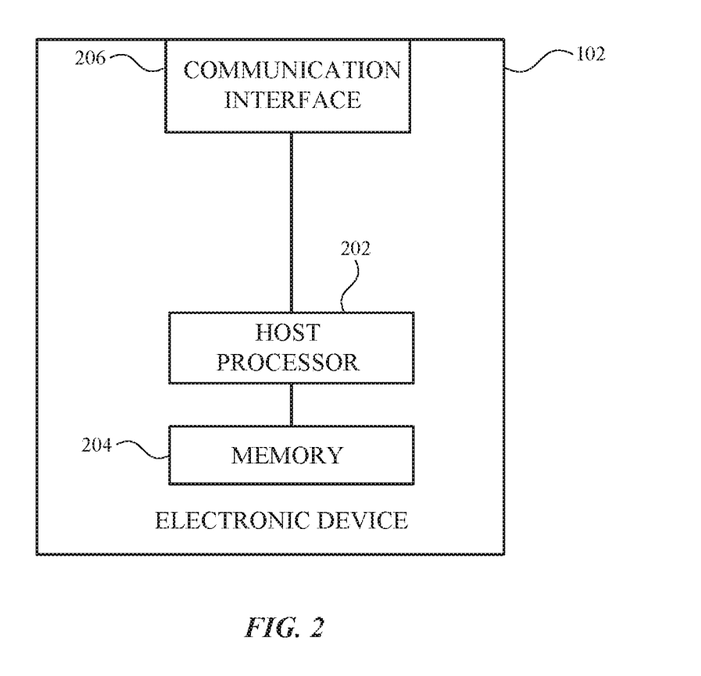
FIG. 2 illustrates an example server that may implement a system for determining whether a semantically relevant answer can be provided in response to a question in accordance with one or more implementations.

FIG. 2 illustrates an example server that may implement a system for determining whether a likely semantically relevant answer can be provided in response to a question in accordance with one or more implementations. For example, the server can correspond to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The server 108 may include a host processor 202, a memory 204, and a communication interface 206. The host processor 202 may include suitable logic, circuitry, and/or code that enable processing data and/or controlling operations of the server 108. In this regard, the host processor 202 may be enabled to provide control signals to various other components of the server 108. The host processor 202 may also control transfers of data between various portions of the server 108. Additionally, the host processor 202 may enable implementation of an operating system or otherwise execute code to manage operations of the server 108. In the subject system, the host processor 202 may implement the software architecture for generating a machine learning model as discussed further below with respect to FIG. 3, and/or for employing the machine learning model as discussed further below with respect to FIG. 4.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may locally store the corpus of data 110 (e.g., which is generated from online question and answer forums). As noted above, however, the corpus of data 110 may also be remote from the server 108 and accessible via the network 106.

The communication interface 206 may include suitable logic, circuitry, and/or code that enables wired or wireless communication, such as between any of the electronic devices 102-104, the corpus of data 110 and the server 108 over the network 106. The communication interface 206 may include, for example, one or more of a Bluetooth communication interface, an NFC interface, a Zigbee communication interface, a WLAN communication interface, a USB communication interface, or generally any communication interface. The communication interface 206 may be used receive a question (e.g., from any of the electronic devices 102-104), and/or to transmit an answer to the question, or a notification that the Q&A service cannot provide an answer to the question, to the electronic devices 102-104. In addition, the communication interface 206 may be used to access the corpus of data 110 via network 106, in a case where all or part of the corpus of data 110 is remote to the server 108.

In one or more implementations, one or more of the host processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
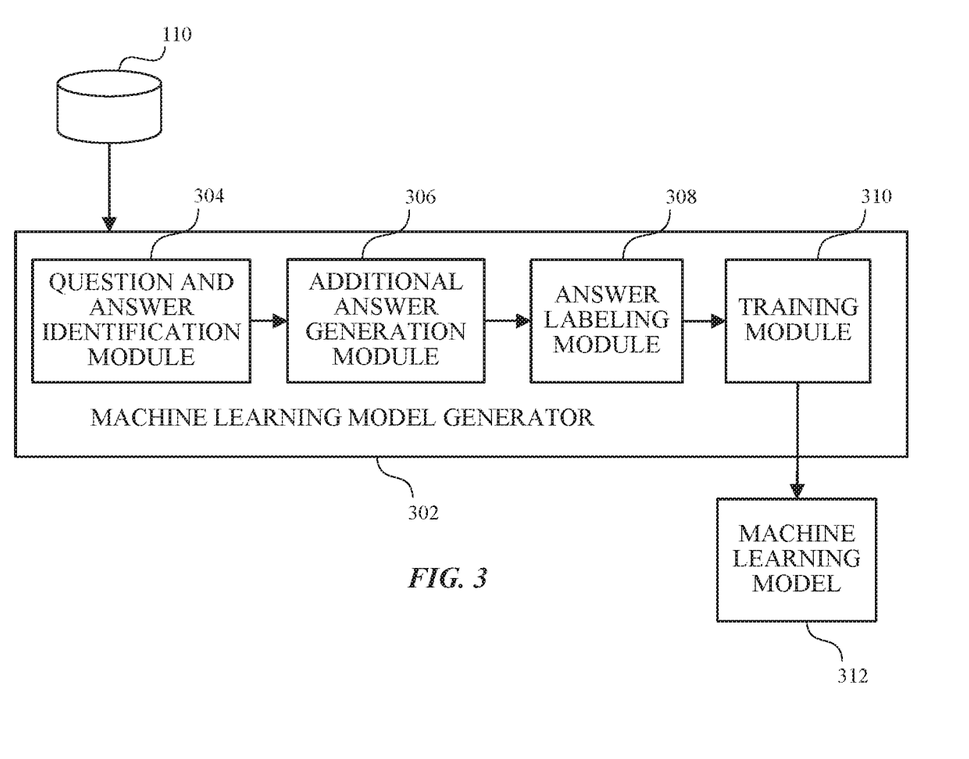
FIG. 3 illustrates an example of a machine learning model generator of the subject system that may be implemented by a server in accordance with one or more implementations.

FIG. 3 illustrates an example of a machine learning model generator of the subject system that may be implemented by a server in accordance with one or more implementations. For example, the machine learning model generator 302 can be implemented by one or more software modules running on the host processor 202 of the server 108 and/or any other device. In another example, the machine learning model generator 302 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 3, the machine learning model generator 302 takes the corpus of data 110 as input, to generate and train the machine learning model 312. In one or more implementations, the machine learning model generator 302 includes a question and answer identification module 304, an additional answer generation module 306, an answer labeling module 308, and a training module 310.

In one or more implementations, the corpus of data 110 corresponds to data generated based on online question and answer forums, as discussed above. The forum data may be extracted from the online forums and stored locally in the corpus of data 110, or may correspond to data accessed in real-time from the online forums.

The question and answer identification module 304 is used to identify a question and an answer to the question from the corpus of data 110 (e.g., corresponding to the question and answer indices), where the answer is indicated as being semantically relevant with respect to the question. In this regard, the forum data may include multiple questions asked by users of the forums. For a given question, the forum data may provide multiple answers to the question answered by the users of the forums. In one or more implementations, for each answered question, the forum data may further provide a ranking for the answers to the question. For example, the ranking may be determined based on forum users indicating agreement (e.g., clicking a thumbs up or "+" interface element) or disagreement (e.g., clicking a thumbs down or "−" interface element) with each answer. In one or more implementations, the forum data may include an indicator of the correct or best answer to the question, and therefore the correct or best answer may be determined to be a semantically relevant answer with respect to the question. For example, the forum web page may highlight the correct or best answer and/or provide a graphical indicator next to the correct or best answer.

For each of the answered questions as provided by the forums, the question and answer identification module 304 may identify a correct answer for the question, which is therefore determined to be a semantically relevant answer to the question. The question and answer identification module 304 may identify the correct answer based on the above-mentioned ranking and/or graphical indications provided on the forum web pages. For example, the highest-ranked answer (e.g., corresponding to more user agreement) to a given question may be determined to be the correct answer the question, and therefore may be determined to be a more semantically relevant answer to the question than the other answers to the question.

Alternatively or in addition, the question and answer identification module 304 may identify the semantically relevant answer based on matching a threshold semantic similarity with the question as presented in the forum. For example, to be semantically relevant, an answer may have to share a certain number of similar terms (or tokens) with the question, and/or have terms that appear in a predefined order with respect to the question. In one or more implementations, to be semantically relevant, an answer may need to include a minimum number of terms, where the minimum number is based on, for example, the number of terms in the question.

In one or more implementations, a question extracted from the forum may be "what is a group of monkeys called?" The question and answer identification module 304 may determine that the correct answer to the question (as extracted from the forums) may be "a group of monkeys is called a troop." For example, this answer may have been highly-ranked per the forum data, and have several terms which coincide with terms in the question. An answer of "a troop" may be highly-ranked per the forum data, but not selected as the semantically relevant answer since it does not share a threshold number of terms (tokens) with the question, and/or does not include a minimum number of terms.

After a question and semantically relevant answer have been identified, the additional answer generation module 306 uses the question and answer indices corresponding to the corpus of data 110 to identify additional answers to the question. In doing so, the additional answer generation module 306 may identify a predefined number of additional answers (e.g., 10 answers, or between a range of 8-12 answers) to the question. As such, it is possible to maintain a ratio of semantically relevant answers (e.g., one) to additional answers (e.g., ten) for a given question. For example, the corpus of data 110 may store questions and answers scraped from 500,000 to 2,000,000 forum-based documents, and a ratio of one semantically relevant answer to ten semantically irrelevant answers per question may be an appropriate ratio for this number of documents.

In one or more implementations, the additional answer generation module 306 selects the additional answers as those that are determined to be semantically irrelevant with respect to the question. For example, the additional answer generation module 306 may obtain the additional answers by concatenating the question and answer, e.g., concatenating the question tokens and the answer tokens, and searching the answer index using the concatenated question and answer.

Alternatively or in addition, the additional answer generation module 306 may identify the determined semantically irrelevant answers based on having semantic similarity to the question and/or determined semantically relevant answer, but not enough similarity to be semantically relevant. For example, the determined semantically irrelevant answers may share a certain number of similar terms and/or an order of terms with respect with to the question, but not meet the similarity threshold required to be determined as semantically relevant. Thus, the semantically irrelevant answers identified by the additional answer generation module 306 may be semantically related to the question and determined semantically relevant answer, but below the threshold similarity. In this manner, it is possible to provide more refined training data, e.g. semantically similar answers that are not labelled as semantically relevant, to the machine learning model 312.

Following the generation of the additional answers, the answer labeling module 308 assigns a positive label to each determined semantically relevant answer (e.g., with one semantically relevant answer per question), and further assigns a negative label to each determined semantically irrelevant answer (e.g., with ten semantically irrelevant answers per question). For example, the positive label can be designated as a 1 for each determined semantically relevant answer, and the negative label can be designated as a 0 for each determined semantically irrelevant answer.

For each indexed question, the training module 310 generates and trains the machine learning model 312 by providing as input to the machine learning model 312: the question, the determined semantically relevant answer with its positive label (e.g., 1), and each of the determined semantically irrelevant answers with their respective negative label (e.g., 0). In one or more implementations, the machine learning model 312 may be trained, for each relevant/irrelevant answer for a question, by concatenating the question with the answer and training the model using the concatenated question and answer along with the label for the answer. As noted above, since the determined semantically irrelevant answers may be semantically related to (but below the threshold similarity) with respect to the question and/or determined semantically relevant answer, it is possible to train the machine learning model 312 with a more refined data set. Thus, the machine learning model 312 may be able to more accurately determine whether a semantically relevant answer (e.g., an answer that makes sense with respect to the question) can be provided for a new question provided to the Q&A service.

In one or more implementations, the machine learning model generator 302, the question and answer identification module 304, the additional answer generation module 306, the answer labeling module 308, the training module 310, and the machine learning model 312 are implemented as software instructions, stored in the memory 204, which when executed by the host processor 202, cause the host processor 202 to perform particular function(s).

In one or more implementations, one or more of the machine learning model generator 302, the question and answer identification module 304, the additional answer generation module 306, the answer labeling module 308, the training module 310, and the machine learning model 312 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
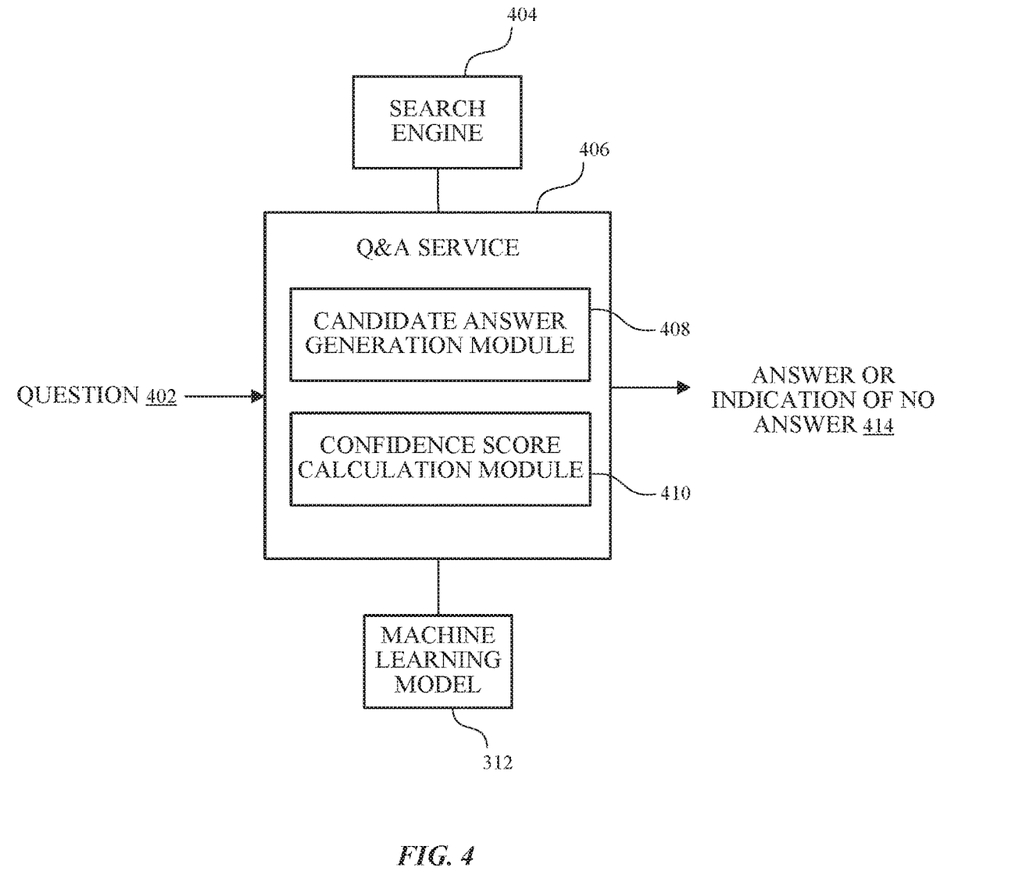
FIG. 4 illustrates an example of a Q&A service of the subject system that may be implemented by a server in accordance with one or more implementations.

FIG. 4 illustrates an example of a Q&A service of the subject system that may be implemented by a server in accordance with one or more implementations. For example, the Q&A service 406 can be implemented by one or more software modules running on the host processor 202 of the server 108 and/or any other device. In another example, the Q&A service 406 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The Q&A service 406 may include a candidate answer generation module 408 and a confidence score calculation module 410. The Q&A service 406 receives a question 402 as input. In response, the Q&A service may provide output 414 in the form of an answer, or an indication that the question cannot be answered. The Q&A service may access both a search engine 404 and the machine learning model 312 in order to provide the output 414.

In one or more implementations, the question 402 may be received from the electronic device 102 based on user input via an application running on the electronic device 102. For example, the application may be a virtual assistant application, a browser, or a system-wide search application, each of which may provide multiple ways for a user to ask a question (e.g., voice input, text-based input).

The candidate answer generation module 408 searches for candidate answers to the received question 402. In one or more implementations, searching for the candidate answers includes querying the search engine 404 with the question and receiving search results from the search engine 404.

In one or more implementations, the search engine 404 is an internet-based search engine. The search engine 404 may be implemented on the server 108, or on a different server connected to the network 106. In communicating with the search engine 404, the candidate answer generation module 408 may have appropriate application interfaces (APIs) for sending the query to, and for receiving results from, the search engine 404.

The search engine 404 may provide search results which are ranked by relevance. For example, the search engine 404 may provide the candidate answer generation module 408 with an ordered list of search results based on the ranking.

In one or more implementations, the candidate answer generation module 408 may prune the ordered list of search results received from the search engine 404 (e.g., limiting the candidate answers to the highest-ranked 25 search results).

The search results may be provided by the search engine 404 in one or more data types, including but not limited to text, hyperlinks, documents, images, videos or audio files. In addition to pruning, the candidate answer generation module 408 may format the ordered list received from the search engine 404, in order to generate candidate answers to the question 402.

The confidence score calculation module 410 provides the question 402 and the candidate answers to the machine learning model 312, which in turn provides a confidence score for each of the candidate answers. In one or more implementations, the confidence score calculation module 410 tokenizes each question and candidate answer, and provides the tokenized question and candidate answer to the machine learning model 312 to obtain the confidence score for the candidate answer.

For example, for a given question with 25 candidate answers, the confidence score calculation module 410 tokenizes the question (e.g., based on the terms/tokens corresponding to the question), and similarly tokenizes each of the 25 candidate questions. The confidence score calculation module 410 then sends the tokenized version of question and the tokenized versions of the 25 candidate answers to the machine learning model 312.

As noted above, the question 402 may be a new question that was not used in training the machine learning model 312. However, based on the training data that was used for known questions and answers (e.g., a determined semantically relevant answer and multiple semantically irrelevant answers for each question), it is possible for the machine learning model 312 to determine whether one of the candidate answers (based on results from the search engine 404) is likely semantically relevant with respect to the question 402. To make this determination, the machine learning model 312 determines a confidence score for each candidate answer.

In one or more implementations, each candidate answer is assigned a relevant-irrelevant value pair, where adding the relevant and irrelevant values for each pair equals 1. For example, a first candidate answer may have a relevant-irrelevant value pair of [0.7, 0.3], while a second candidate answer may have a relevant-irrelevant value pair of [0.5, 0.5]. The machine learning model 312 may calculate a net effect for each relevant-irrelevant value pair, by determining the difference between the relevant value and irrelevant value for that pair. For example, the relevant-irrelevant value pair of [0.7, 0.3] has a net effect of 0.4, while the relevant-irrelevant value pair of [0.5, 0.5] has a net effect of 0.

The machine learning model 312 may set a threshold value for the net effect, and filter out all candidate answers that do not meet the threshold. For example, the machine learning model 312 may set the threshold value for the net effect as 0.6. In one example, for the 25 candidate answers initially considered, 20 of them may be removed as not having a net effect of at least 0.6.

The machine learning model 312 may select a candidate answer from the remaining answers as the answer to the question 402. In one or more implementations, the candidate answer with the highest net effect may be selected as the answer. Alternatively, the highest-ranked candidate answer, as determined by the search engine 404 ranking, may be selected from the remaining candidate answers as the answer to the question 402.

Thus, if at least one candidate answer meets the threshold value for the net effect, the Q&A service 406 can provide a likely semantically relevant answer (e.g., based on confidence) as output 414. However, it may be the case that none of the candidate answers meet the threshold value for confidence. This suggests a low confidence for providing a likely semantically relevant answer in response to the question 402. Instead of providing an answer as output, the Q&A service 406 may return a message such as "sorry, I can't answer that question," such as within a virtual assistant application. Alternatively, the Q&A service 406 may return no results (e.g., a blank listing of results) within a browser or a system-wide search application.

In one or more implementations, the Q&A service 406 may provide for human evaluation and/or human supervised learning for the machine learning model 312. For example, the Q&A service 406 may provide for a training mode, in which an administrative or training user supplements the machine learning model 312 with additional training data. In this mode, multiple instances of predefined questions may be provided as input 402 to the Q&A service 406, and Q&A service 406 may provide answers or indications of no answer as output 414.

The user who is training the machine learning model 312 in the training mode may evaluate the output 414. For example, via a user interface, the training user may confirm the output and/or disagree with the output 414. For example, if an answer that is semantically irrelevant (e.g., nonsensical with respect to the question as determined by the user) is provided as the output 414, the user may indicate so via the user interface, and the machine learning model 312 may be updated accordingly. For example, the machine learning model 312 may be retrained with the question and concatenated answer along with a label of 0.

In one or more implementations, such supplemental training may occur in a non-training mode (e.g., during normal use). For example, the end user who provided the question 402 may provide feedback when the end user believes that the output 414 is semantically irrelevant with respect to the question. For example, the end user may provide verbal feedback, such as "that is not what I was asking," or "that answer doesn't make sense." In one or more implementations, the user may be provided with the option to launch the user interface within the Q&A service 406, so that the user is not automatically prompted to confirm/disagree on every answer provided by the Q&A service 406.

In one or more implementations, the search engine 404, the machine learning model 312, and the Q&A service 406, including the candidate answer generation module 408 and the confidence score calculation module 410, are implemented as software instructions, stored in the memory 204, which when executed by the host processor 202, cause the host processor 202 to perform particular function(s).

In one or more implementations, one or more of the search engine 404, the machine learning model 312, the Q&A service 406, the candidate answer generation module 408, and the confidence score calculation module 410 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
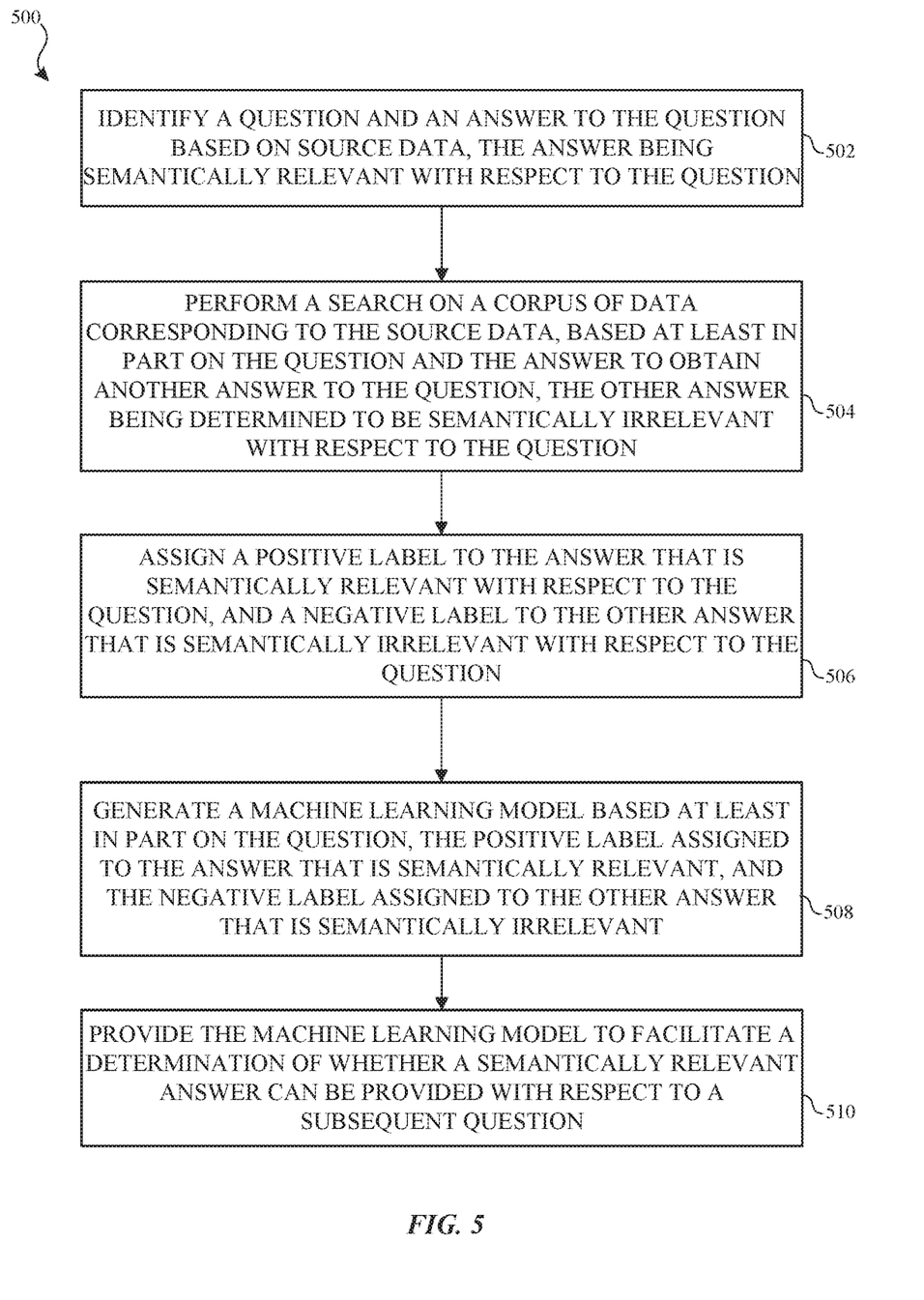
FIG. 5 illustrates a flow diagram of an example process for providing a machine learning model in accordance with one or more implementations.

FIG. 5 illustrates a flow diagram of an example process for providing a machine learning model in accordance with one or more implementations. For explanatory purposes, the process 500 is primarily described herein with reference to the server 108 of FIG. 1. However, the process 500 is not limited to the server 108 of FIG. 1, and one or more blocks (or operations) of the process 500 may be performed by one or more other components of the server 108 and/or by other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The server 108 identifies a question and an answer to the question based on source data (e.g., question and answer forums). The answer is indicated in the source data as being relevant with respect to the question and therefore the server 108 determines that the answer is semantically relevant with respect to the question (502).

The server 108 performs a search on a corpus of data 110 corresponding to the source data based at least in part on the question and the answer to obtain another answer to the question, the other answer being determined to be semantically irrelevant with respect to the question (504). The source data may include question and answer forums, and the corpus of data may be generated based on crawling the question and answer forums. The other answer may be semantically similar to the question and/or the answer.

The server 108 assigns a positive label to the answer that is determined to be semantically relevant with respect to the question, and a negative label to the other answer that is determined to be semantically irrelevant with respect to the question (506). The server 108 generates a machine learning model 312 based at least in part on the question, the positive label assigned to the answer that is semantically relevant, and the negative label assigned to the other answer that is semantically irrelevant (508).

The server 108 provides the machine learning model 312 to facilitate a determination of whether a likely semantically relevant answer can be provided with respect to a subsequent question (510).

In one or more implementations, the server 108 may receive the subsequent question, search for candidate answers to the subsequent question, and provide the subsequent question and the candidate answers to the machine learning model 312 to obtain a confidence score for each of the candidate answers. In one or more implementations, the subsequent question may be received via a virtual assistant application, a browser, or a system-wide search application, and searching for the candidate answers may include performing an internet-based search with the subsequent question.

In one or more implementations, the server 108 may determine that a likely semantically relevant answer can be provided with respect to the subsequent question when the confidence score for at least one of the candidate answers satisfies a confidence score threshold. The server 108 may select, in response to the determination, a candidate answer from the at least one of the candidate answers (e.g., with a highest search ranking, or with the highest confidence score), and provide the selected candidate answer in response to the subsequent question.

In one or more implementations, the server 108 may determine that a likely semantically relevant answer cannot be provided with respect to the subsequent question when the confidence score for each of the candidate answers does not satisfy a confidence score threshold, and provide. In response to the determination, the server 108 may send an indication that an answer cannot be provided with respect to the subsequent question.

As described above, one aspect of the present technology is the gathering and use of data available from various sources to, for example, improve the delivery to users of content that may be of interest to them, such as providing answers to users' questions. The present disclosure contemplates that in some instances, this gathered data may include personal information data that identifies user activity on an electronic device with respect to a specific person. Such personal information data can include, for example, identification of user interests, demographic data, temporal-based data, location-based data, or other identifying information.

The present disclosure recognizes that the use of such personal information data, in the present technology, can be used to the benefit of users. For example, the personal information data can be used to deliver targeted content that is of greater interest to the user (e.g., providing the user with relevant search results or query suggestions, providing the user with answers to questions that are likely semantically relevant, and the like). Accordingly, use of such personal information data enables discrete control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. As is described herein, the collected personal information is only stored on the user's own devices, with the exception of temporarily caching some data on a server for transport purposes.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select not to provide temporal or location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publically available information.

Figure 6:
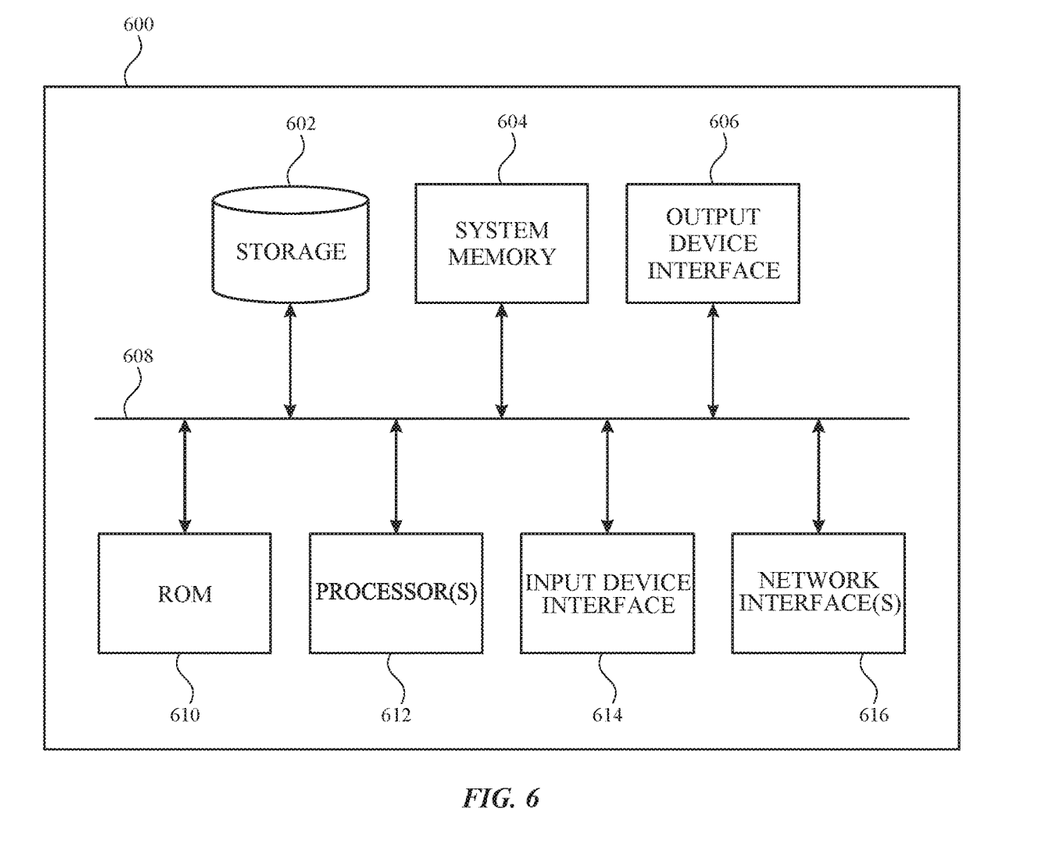
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102-104, and/or one or the server 108 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the server 108 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   at least one processor; and a memory including instructions that, when executed by the at least one processor, cause the at least one processor to:
  identify a question and an answer to the question based on source data, the answer being determined to be semantically relevant with respect to the question based at least in part on the answer including terms that appear in a particular order with respect to an order that terms appear in the question;
  perform a search on a corpus of data corresponding to the source data, based at least in part on the question and the answer to obtain another answer to the question, the other answer being determined to be semantically irrelevant with respect to the question;
  assign a positive label to the answer that is semantically relevant with respect to the question, and a negative label to the other answer that is semantically irrelevant with respect to the question;
  generate a machine learning model based at least in part on the question, the positive label assigned to the answer that is semantically relevant, and the negative label assigned to the other answer that is semantically irrelevant; and
  provide the machine learning model to facilitate a determination of whether a likely semantically relevant answer can be provided with respect to a subsequent question.

2. The device of claim 1, wherein the instructions further cause the at least one processor to:
  receive the subsequent question;
  search for candidate answers to the subsequent question; and
  provide the subsequent question and the candidate answers to the machine learning model to obtain a confidence score for each of the candidate answers.

3. The device of claim 2, wherein the instructions further cause the at least one processor to:
  determine that the likely semantically relevant answer can be provided with respect to the subsequent question when the confidence score for at least one of the candidate answers satisfies a confidence score threshold;
  select, in response to the determination, a candidate answer from the at least one of the candidate answers; and
  provide the selected candidate answer in response to the subsequent question.

4. The device of claim 2, wherein the instructions further cause the at least one processor to:
  determine that the likely semantically relevant answer cannot be provided with respect to the subsequent question when the confidence score for each of the candidate answers does not satisfy a confidence score threshold; and
  provide, in response to the determination, an indication that an answer cannot be provided with respect to the subsequent question.

5. The device of claim 2, wherein searching for the candidate answers comprises performing an internet-based search with the subsequent question.

6. The device of claim 2, wherein the subsequent question is received via a virtual assistant application, a browser, or a system-wide search application.

7. The device of claim 1, wherein the source data comprises question and answer forums, and wherein the corpus of data is generated based on crawling the question and answer forums.

8. The device of claim 1, wherein the other answer is determined to be semantically related to the question and the answer.

9. A computer program product comprising code stored in a non-transitory computer-readable storage medium, the code comprising:
  code to identify a question and an answer to the question based on source data, the answer being determined to be semantically relevant with respect to the question based at least in part on the answer including terms that appear in a particular order with respect to an order that terms appear in the question;
  code to perform a search on a corpus of data corresponding to the source data, based at least in part on the question and the answer to obtain other answers to the question, the other answers being determined to be semantically irrelevant with respect to the question;
  code to assign a positive label to the answer that is determined to be semantically relevant with respect to the question, and negative labels to the other answers that are determined to be semantically irrelevant with respect to the question;
  code to generate a machine learning model based at least in part on the question, the positive label assigned to the answer that is determined to be semantically relevant, and the negative labels assigned to the other answers that are determined to be semantically irrelevant; and
  code to provide the machine learning model to facilitate a determination of whether a likely semantically relevant answer can be provided with respect to a subsequent question.

10. The computer program product of claim 9, wherein a total number of the other answers is predefined.

11. The computer program product of claim 9, the code further comprising:
  code to receive the subsequent question;
  code to search for candidate answers to the subsequent question; and
  code to provide the subsequent question and the candidate answers to the machine learning model to obtain a confidence score for each of the candidate answers.

12. The computer program product of claim 11, the code further comprising:
  code to determine that the likely semantically relevant answer can be provided with respect to the subsequent question when the confidence score for at least one of the candidate answers satisfies a confidence score threshold;
  code to select, in response to the determination, a candidate answer from the at least one of the candidate answers; and
  code to provide the selected candidate answer in response to the subsequent question.

13. The computer program product of claim 11, the code further comprising:
  code to determine that the likely semantically relevant answer cannot be provided with respect to the subsequent question when the confidence score for each of the candidate answers does not satisfy a confidence score threshold; and
  code to provide, in response to the determination, an indication that an answer cannot be provided with respect to the subsequent question.

14. The computer program product of claim 11, wherein searching for the candidate answers comprises performing an internet-based search with the subsequent question.

15. The computer program product of claim 11, wherein the subsequent question is received via a virtual assistant application, a browser, or a system-wide search application.

16. The computer program product of claim 9, wherein the source data comprises question and answer forums, and wherein the corpus of data is generated based on crawling the question and answer forums.

17. The computer program product of claim 9, wherein at least one of the other answers is semantically related to the question and the answer.

18. A method, comprising:
    identifying a question and an answer to the question based on source data, the answer being determined to be semantically relevant with respect to the question based at least in part on the answer including terms that appear in a particular order with respect to an order that terms appear in the question;
    perform a search on a corpus of data corresponding to the source data, based at least in part on the question and the answer to obtain another answer to the question, the other answer being determined to be semantically irrelevant with respect to the question;
    assigning a positive label to the answer that is determined to be semantically relevant with respect to the question, and a negative label to the other answer that is determined to be semantically irrelevant with respect to the question;
    generating a machine learning model based at least in part on the question, the positive label assigned to the answer that is determined to be semantically relevant, and the negative label assigned to the other answer that is determined to be semantically irrelevant;
    receiving a subsequent question;
    searching for candidate answers to the subsequent question;
    providing the subsequent question and the candidate answers to the machine learning model to obtain a confidence score for each of the candidate answers; and
    determining whether a likely semantically relevant answer can be provided with respect to the subsequent question based on the confidence scores.

19. The method of claim 18, further comprising:
    determining that the likely semantically relevant answer can be provided with respect to the subsequent question when the confidence score for at least one of the candidate answers satisfies a confidence score threshold;
    selecting, in response to the determination, a candidate answer from the at least one of the candidate answers; and
    providing the selected candidate answer in response to the subsequent question.

20. The method of claim 18, further comprising:
    determining that the likely semantically relevant answer cannot be provided with respect to the subsequent question when the confidence score for each of the candidate answers does not satisfy a confidence score threshold; and
    providing, in response to the determination, an indication that an answer cannot be provided with respect to the subsequent question.

21. The device of claim 1, wherein the answer that is semantically relevant matches the question with at least a threshold semantic similarity and the other answer that is semantically irrelevant matches the question with less than the threshold semantic similarity.

22. The device of claim 1, wherein the answer that is semantically relevant shares at least a threshold number of terms with the question, and the other answer that is semantically irrelevant does not share at least the threshold number of terms with the question.

* * * * *